(12) United States Patent
Hsing-Hsien (10) Patent No.: US 7,584,865 B2
(45) Date of Patent: Sep. 8, 2009

(54) PAPER WIPER BRACKET USED IN AN AUTOMOBILE

(75) Inventor: Ko Hsing-Hsien, Taipei Hsien (TW)

(73) Assignee: An Bor Teh Industrial Co., Ltd., Th Cheng, Taipei County ( * ) Notice: Subject to any disclaimer, the term of this patent is extended or adjusted under 35 U.S.C. 154(b) by 494 days.

(21) Appl. No.: 11/296,623

(22) Filed: Dec. 8, 2005

(65) Prior Publication Data

US 2007/0131695 A1    Jun. 14, 2007

(51) Int. Cl.
    B65D 25/00    (2006.01)
(52) U.S. Cl. ...................................... 220/483
(58) Field of Classification Search ............... 220/483, 220/480, 230, 812, 811, 810, 476; 206/233, 206/216; 224/562, 555, 545; 248/683, 537, 248/534, 206.5, 205.1, 309.4, 309.1
    See application file for complete search history.

(56) References Cited

U.S. PATENT DOCUMENTS

| | | | | |
|---|---|---|---|---|
| 1,361,318 A | * | 12/1920 | Ephlin | 229/120.38 |
| 2,537,050 A | * | 1/1951 | Gluck | 220/480 |
| 2,603,530 A | * | 7/1952 | Jones | 296/97.6 |
| 2,673,056 A | * | 3/1954 | Manetti | 248/311.2 |
| 2,908,434 A | * | 10/1959 | Schnabel | 224/539 |
| 2,990,950 A | * | 7/1961 | Alexander | 206/216 |
| 3,168,275 A | * | 2/1965 | Grondin | 248/205.3 |
| 3,201,072 A | * | 8/1965 | Du Bois | 248/99 |
| 3,288,416 A | * | 11/1966 | Franklin | 248/311.3 |
| 3,416,761 A | * | 12/1968 | Shanok et al. | 248/115 |
| 3,476,257 A | * | 11/1969 | O'Connell | 211/13.1 |
| 3,482,910 A | * | 12/1969 | Debelius | 353/42 |
| 3,819,043 A | * | 6/1974 | Harrison | 206/449 |
| 3,986,479 A | * | 10/1976 | Bonk | 118/506 |
| 4,020,986 A | * | 5/1977 | McAtee | 224/42.33 |
| 4,143,762 A | * | 3/1979 | Spiegelberg | 206/210 |
| 4,557,445 A | * | 12/1985 | Ohara | 248/27.1 |
| 4,735,317 A | * | 4/1988 | Sussman et al. | 206/449 |
| 4,981,243 A | * | 1/1991 | Rogowski | 224/431 |
| 5,410,774 A | * | 5/1995 | Adams | 15/230.1 |
| 5,996,956 A | * | 12/1999 | Shawver | 248/309.1 |
| 6,045,038 A | * | 4/2000 | Smith et al. | 229/167 |
| 6,401,995 B1 | * | 6/2002 | Yuille et al. | 224/404 |
| 2005/0189455 A1 | * | 9/2005 | Formon | 248/200 |
| 2006/0000739 A1 | * | 1/2006 | Kadish | 206/494 |
| 2006/0054517 A1 | * | 3/2006 | Albert | 206/233 |

FOREIGN PATENT DOCUMENTS

GB          2149762 A  *  6/1985

* cited by examiner

*Primary Examiner*—Anthony D Stashick
*Assistant Examiner*—Robert J Hicks (57) ABSTRACT

A paper wiper bracket used in an automobile comprises an upper cover and a connecting mechanism. The central portion of the upper cover is bulged upward to form a container whose inside space defines a receptacle for retaining a magnet. Thereby, the upper cover can be attached onto a top inner wall of an automobile by the magnetic attraction. Two opposite sidewalls of a mount for the magnet are each provided with a placement slot for housing a piece of sponge, whereby the sponges will be soaked with liquid that can be added at will by the user. The connecting mechanism can connect a boxy chamber beneath the upper cover by the engagement between the connecting mechanism and corresponding connecting parts around the upper cover, whereby the boxy chamber can be attached onto the inner wall of an automobile with the upper cover.

2 Claims, 8 Drawing Sheets

PAPER WIPER BRACKET USED IN AN AUTOMOBILE

FIELD OF THE INVENTION

The present invention relates to paper wiper brackets used in an automobile, more particularly to a paper wiper bracket used in an automobile wherein the wipers can be kept in a moist state by refilling liquid in the bracket. Therefore, the wipers stored in the present invention are more durable.

BACKGROUND OF THE INVENTION

Automobiles under sunshine will have an internal space at a high temperature, under which tissue papers or wet paper wipers placed in the car will become dry and fragile, even the temperature is reduced by air conditioning device or the opening of car windows. Therefore, tissue papers or wet paper wipers placed in a car are much less durable than those placed at room temperature. Further, a box of tissue papers or paper wipers is usually arbitrarily placed inside a car and therefore is inconvenient for a passenger needs them.

SUMMARY OF THE INVENTION

The primary objective of the invention is to provide a paper wiper bracket used in an automobile including an upper cover whose central portion is bulged upward to form a container having an inside space for housing a magnet retained by a plurality of hook pieces around the inner rim of the container. Two opposite sidewalls of a mount for the magnet are each provided with a placement slot for housing a piece of sponge, whereby the sponges will be soaked with liquid that can be added at will by the user. Therefore, the wipers can be kept in a moist state and therefore are more durable.

The secondary objective of the invention is to provide a paper wiper bracket used in an automobile wherein the edge of the upper cover is provided with a pair of inversely hooked sections for connecting a boxy chamber. The hooked sections are slidably retained by two corresponding guide rails formed along two opposite sides along the inner rim of the boxy chamber. Since the top surface of the upper cover forms a stepped contour, it can be magnetically attached onto a top inner wall of an automobile. Thereby, a passenger in the car can take out wipers form the boxy chamber easily.

The various objects and advantages of the present invention will be more readily understood from the following detailed description when read in conjunction with the appended drawings.

DETAILED DESCRIPTION OF THE PREFERRED EMBODIMENTS

Figure 1:
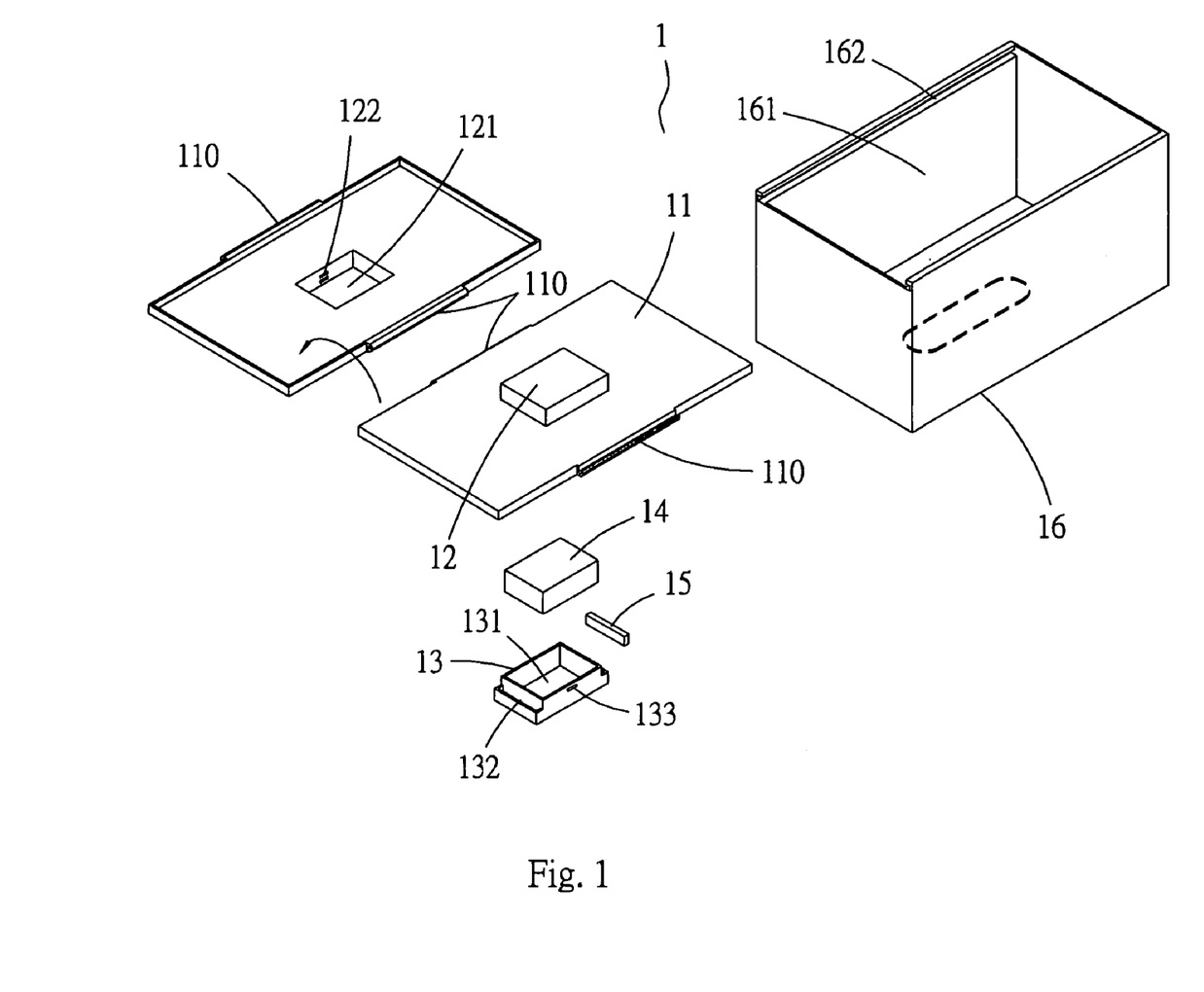
FIG. 1 is an exploded perspective view of a paper wiper bracket used in an automobile of the present invention.
Figure 2:
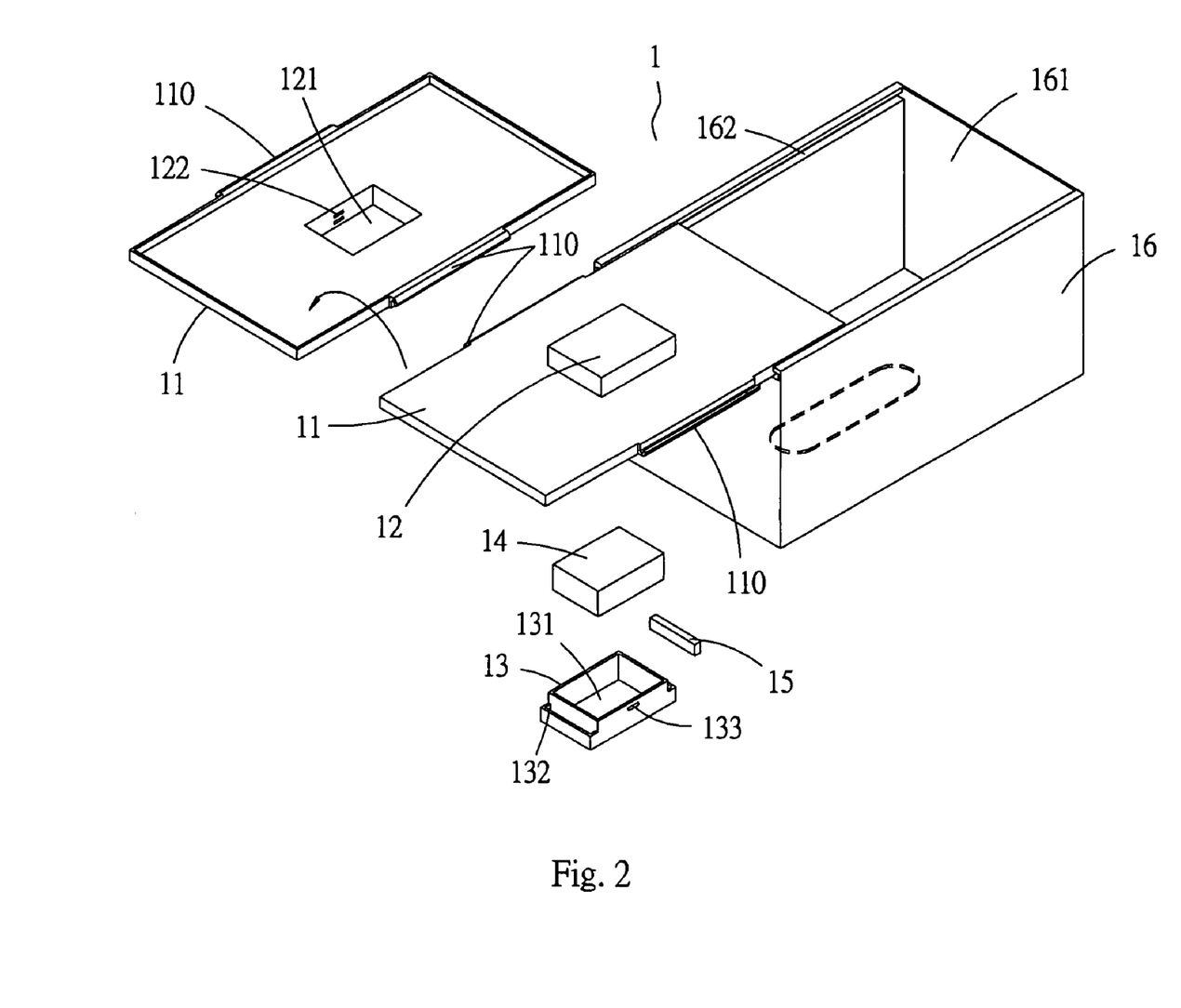
FIG. 2 is another exploded perspective view of the paper wiper bracket used in an showing the insertion of the upper cover.
Figure 3:
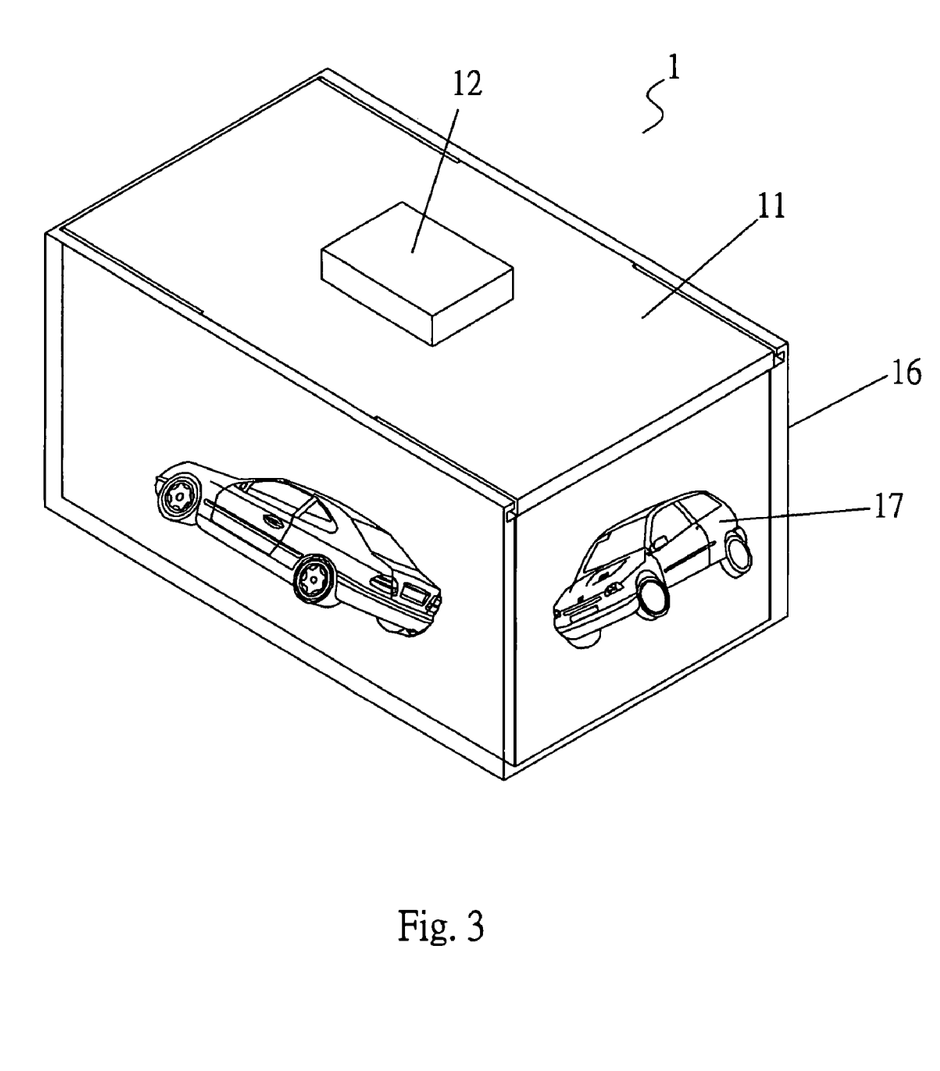
FIG. 3 is a perspective view of the paper wiper bracket used in an automobile.

Referring to FIGS. 1 to 3, a paper wiper bracket 1 used in an automobile according to the present invention comprises an upper cover 11, a container 12, a magnet mount 13, a magnet 14, a plurality of sponges 15 and a boxy chamber 16. The upper face of the upper cover 11 is extended upward with a hollow container 12. The inside space of the container 12 defines a receptacle 121 whose four inner walls are provided with two pairs of oppositely faced horizontal grooves 122. The edges of the upper cover 11 are extended with a plurality of elongated hook sections 110. Further, the lower face of the container 12 is attached with a magnet mount 13. Two opposite sidewalls of the magnet mount 13 are each provided with a placement slot 132 for housing a piece of sponge 15, whereby liquid can be contained within the placement slots 132, and the sponges 15 can be soaked with liquid. Liquid can be refilled into the placement slots 132 so that the wet wipers stored in the boxy chamber 16 can be kept in a moist state. The central portion of the magnet mount 13 is provided with a cavity 131 for housing a magnet 14. The other pair of opposite sidewalls of the magnet mount 13 are each provided with a hook piece 133, whereby, as the magnet mount 13 is attached to the container 12, the hook pieces 133 will be engaged with the horizontal grooves 122 (on the container 12), and whereby the magnet mount 13 will be retained within the receptacle 121. Consequently, the magnet mount 13 is coupled with the upper cover 11. Since the receptacle 121 of the container 12 are provided with horizontally extended horizontal grooves 122, the position of the magnet mount 13 in the container 12 can be adjusted according to a user's need, as shown in FIG. 1. The lower face of the upper cover 11 is connected with a boxy chamber 16, whose enclosed space defines a receptacle 161 for containing a stack of paper wipers. The boxy chamber 16 is coupled to the upper cover 11 via the engagement between two opposite guide rails 162 formed on the top rim of the boxy chamber 16 and two corresponding hook sections 110 formed along two opposite sides of the upper cover 11. Since the top face of the container 12 is bulged out of the upper cover 11, the top surface of the upper cover 11 forms a stepped structure, whereby the paper wiper bracket 1 of the present invention can be attached onto the ceiling of the passenger space of a car by the magnet 14 hidden in the container 12, The bottom face of the boxy chamber 16 is further provided a straight central hole for continuous subtraction of the wipers, as shown in FIG. 2. If the boxy chamber 16 is made of a transparent material, pictures of personal preference 17 can be disposed between the inner wall of the boxy chamber 16 and the outer surface of the carton containing the stack of paper wipers, as shown in FIG. 3. Therefore, the present invention can be more visually appealing.

Figure 4:
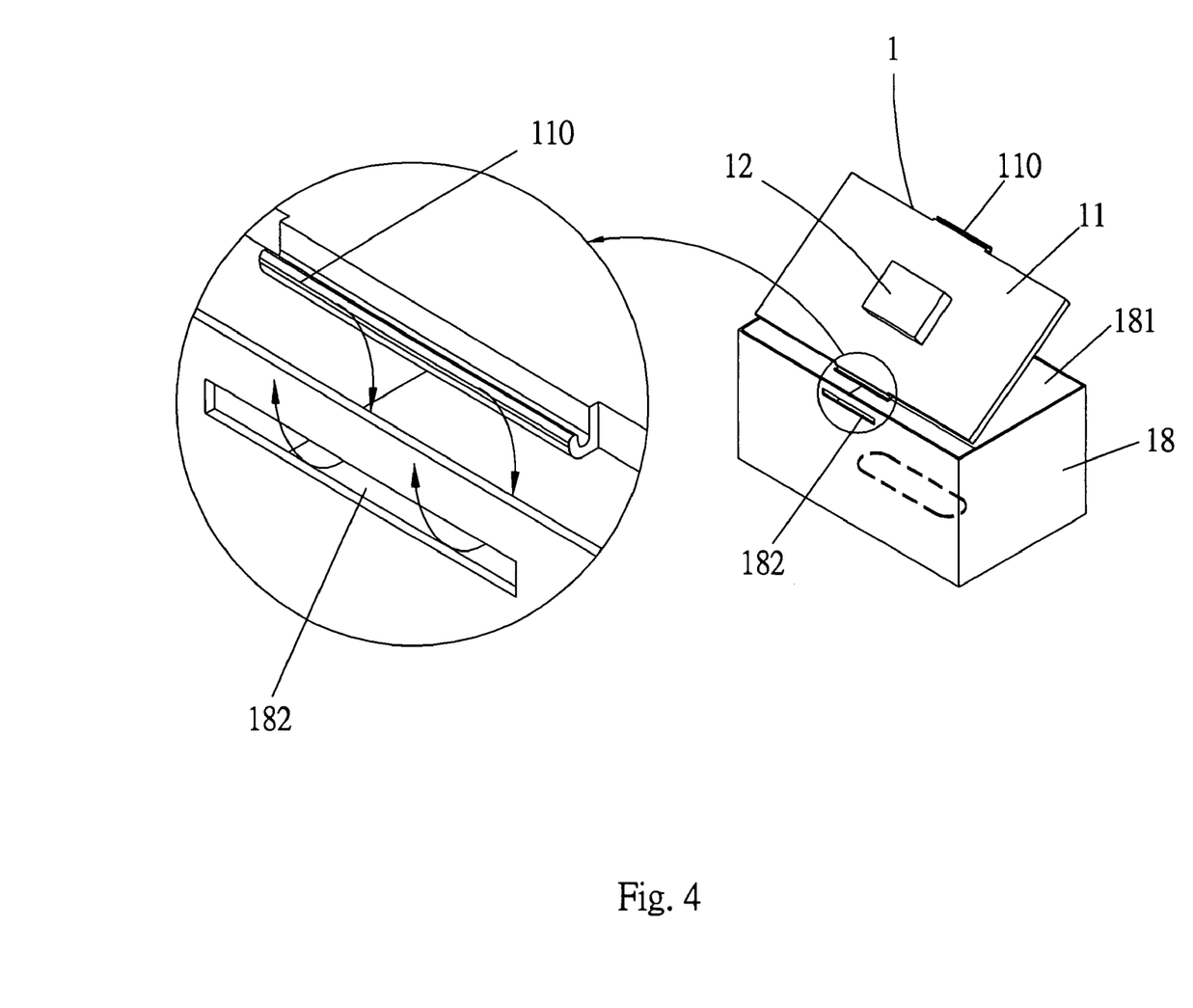
FIG. 4 is the second preferred embodiment of the present invention as a paper wiper bracket used in an automobile having a different connection mechanism between the upper cover and the box chamber.
Figure 5:
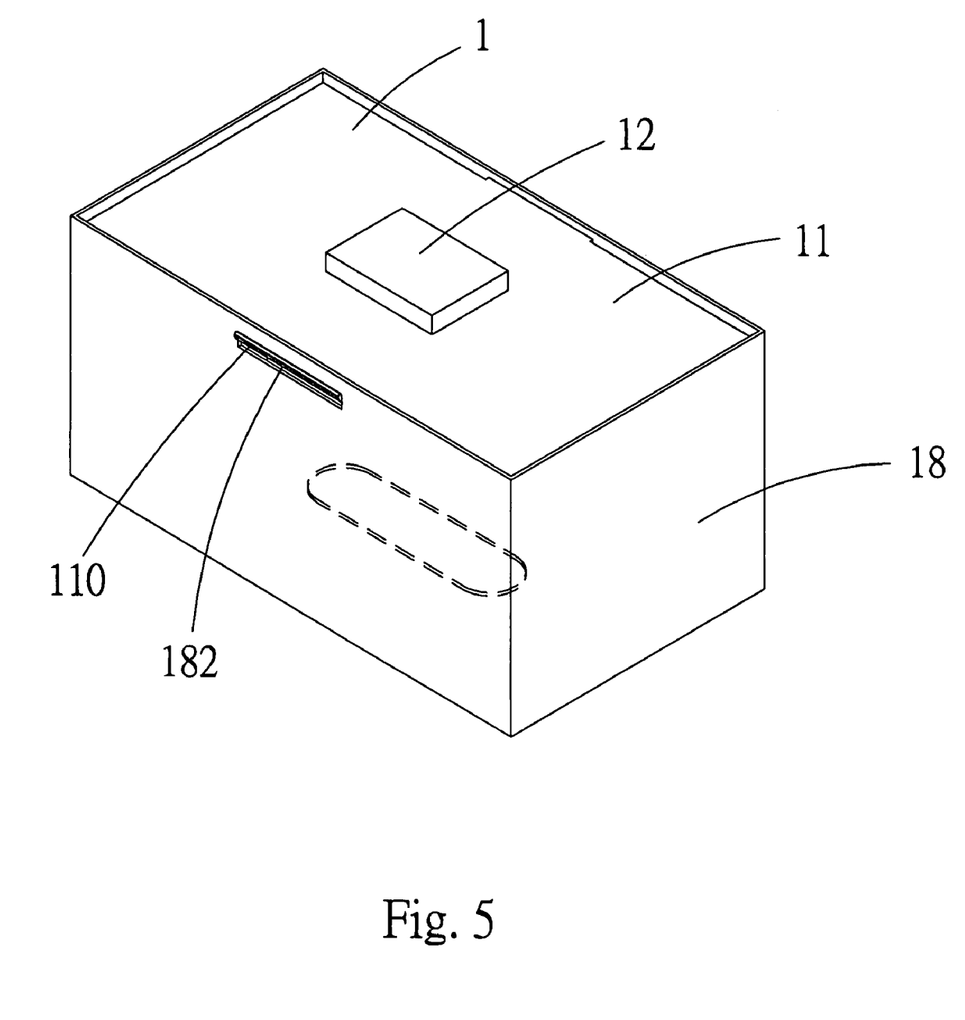
FIG. 5 is a perspective view of the second preferred embodiment of the present invention as a paper wiper bracket used in an automobile in FIG. 4.

Referring to FIGS. 4 and 5, another preferred embodiment of the present invention as a paper wiper bracket used in an automobile 1 has a upper cover 11, a container 12 extended upward from the central portion on the top face of the upper cover 11, a boxy chamber 18 located beneath and engaged with the upper cover 11 by the insertion of the hook sections 110 of the upper cover 11 into the elongated horizontal holes 182 along two lateral sides of the boxy chamber 18. The inside of the boxy chamber 18 defines a receptacle 181 for housing a stack of paper wipers. Further, the bottom face of the boxy chamber 18 is provided with a straight central hole for subtraction of the wipers.

Figure 6:
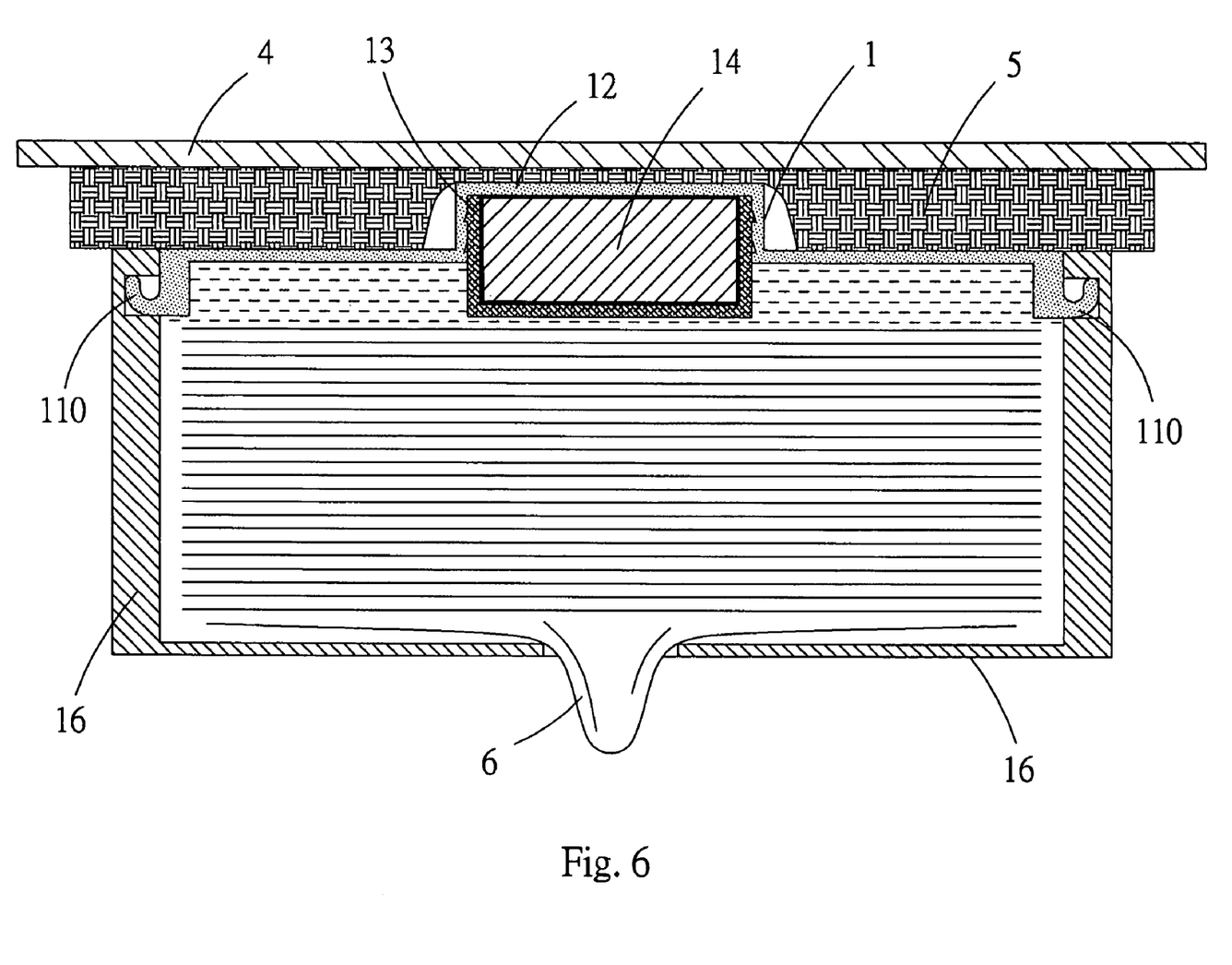
FIG. 6 is a cross-sectional view of the first preferred embodiment of the present invention.

Referring to FIG. 6, the paper wiper bracket used in an automobile 1 utilizes a magnet 14 to attach the top of the container 12 with the top inner wall of an automobile shell 4, whereby the adhesive force applied by the container 12 will make the soft layer of the inner wall 5 flat, and whereby the paper wiper bracket used in an automobile can be attached the automobile shell 4 tight. By the same token, the paper wiper bracket used in an automobile can be attached onto any flat portion on the inner wall. However, the inside space of the automobile shell 4 may have a high temperature under sunlight, which will make the wiper in the paper wiper bracket used in an automobile dry. Under this condition, the liquid contained in the sponges 15 will be vaporized and the water vapor thereby produced will keep the wipers moist and ready for use.

Figure 7:
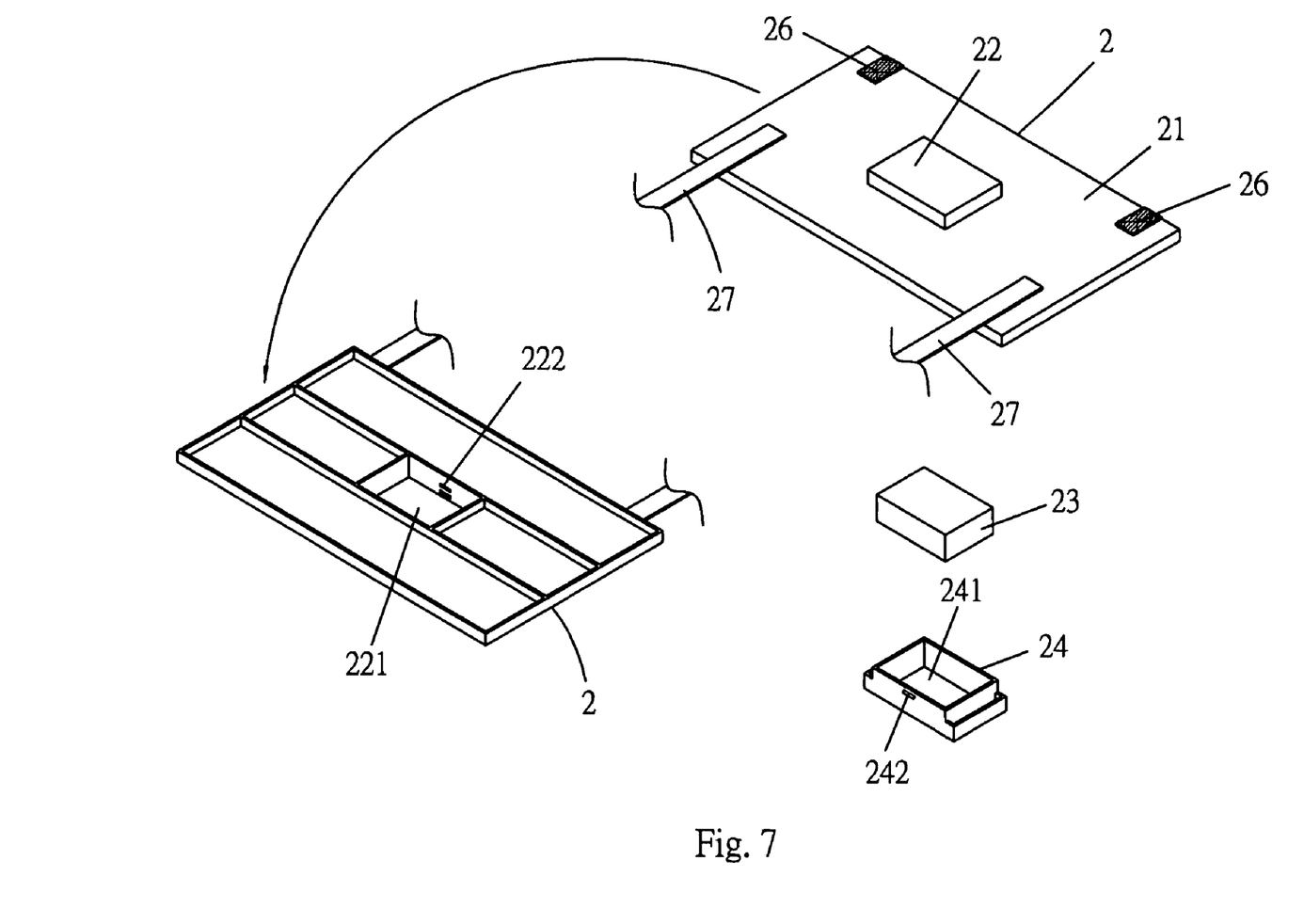
FIG. 7 is an exploded perspective view of the present invention.
Figure 8:
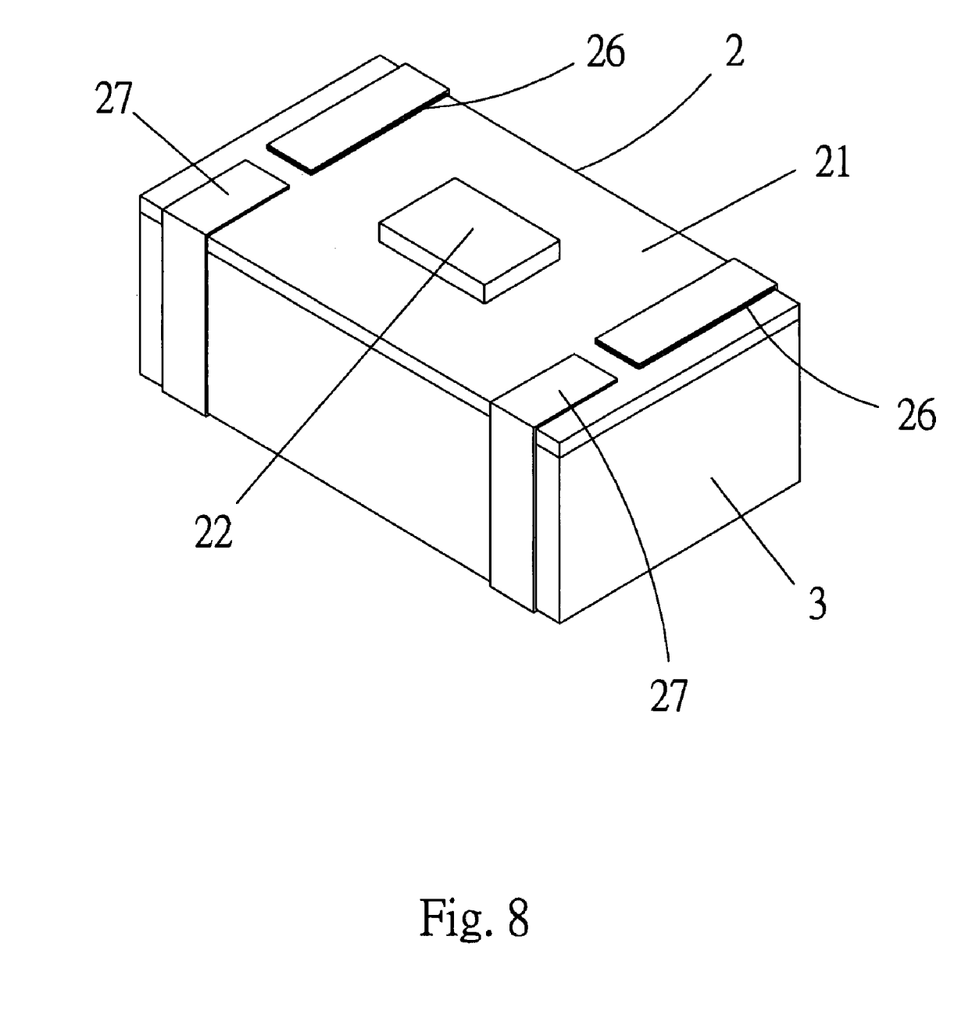
FIG. 8 is a perspective view of the present invention.

Referring to FIGS. 7 and 8, a paper wiper bracket used in an automobile 2 according to the present invention comprises an upper cover 21, a container 22, a magnet mount 24 and a magnet 23. The upper face of the upper cover 21 is extended upward with a hollow container 22. The inside space of the container 22 defines a receptacle 221 whose four inner walls are provided with two pairs of oppositely faced horizontal grooves 222. Further, the lower face of the container 22 is attached with a magnet mount 24. The central portion of the magnet mount 24 is provided with a cavity 241 for housing the magnet 23. The other pair of opposite sidewalls of the magnet mount 13 are each provided with a hook piece 242, whereby, as the magnet mount 13 is attached to the container 22, the hook pieces 242 will be engaged with the horizontal grooves 222 (on the container 22), and whereby the magnet mount 24 will be retained within the receptacle 221. Consequently, the magnet mount 24 is coupled with the upper cover 21. The four corners of the top face of the upper cover 21 are provided with two pairs of opposite adhesive tapes 27 and adhesive pads 26 for binding a carton box 3 of a stack of tissues (not necessarily wet wipers). To attach the tissue box 3, the tissue subtraction side faces downward, whereas the opposite side of the tissue box 3 is attached tight to the lower face of the paper wiper bracket 2, whereby the adhesive tapes 27 can circle around the tissue box 3 and stick to the adhesive pads 26, as shown in FIG. 8. Further, the paper wiper bracket 2 is brought into contact with the inner wall of an automobile shell 4, whereby the magnet 23 therein can stick to a wall portion, so that the passenger in the automobile can take the tissue out of the tissue box 3 easily.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A paper wiper bracket used in an automobile, comprising: an upper cover (11), a container (12), a magnet mount (13), a magnet (14), a plurality of sponges (15) and a boxy chamber (16); wherein an upper face of the upper cover (11) is extended upward with a hollow container (12); an inside space of the container (12) defining a receptacle with (121) four inner walls of which are provided with two pairs of oppositely faced horizontal grooves (122); edges of the upper cover (11) are extended with a plurality of elongated hook sections (110);

a lower face of the container (12) being attached with the magnet mount (13); two opposite sidewalls of the magnet mount (13) are each provided with a placement slot (132) for housing a piece of sponge (15), whereby liquid is contained within the placement slots (132), and the sponges (15) can be soaked with liquid; liquid is refilled into the placement slots (132) so that the wet wipers stored in the boxy chamber (16) can be kept in a moist state; a central portion of the magnet mount (13) is provided with a cavity (131) for housing a magnet (14); the other pair of opposite sidewalls of the magnet mount (13) are each provided with a hook piece (133), whereby, as the magnet mount (13) is attached to the container (12), the hook pieces (133) will be engaged with the horizontal grooves (122) on the container (12), and whereby the magnet mount (13) will be retained within the receptacle (121); consequently, the magnet mount (13) is coupled with the upper cover (11); since the receptacle (121) of the container (12) are provided with horizontally extended horizontal grooves (122), the position of the magnet mount (13) in the container (12) can be adjusted according to a user's need; and a lower face of the upper cover (11) is connected with a boxy chamber (16), whose enclosed space defines a receptacle (161) for containing a stack of paper wipers; the boxy chamber (16) is coupled to the upper cover (11) via the engagement between two opposite guide rails (162) formed on the top rim of the boxy chamber (16) and two corresponding hook sections (110) formed along two opposite sides of the upper cover (11); since the top face of the container (12) is bulged out of the upper cover (11), the top surface of the upper cover (11) forms a stepped structure, whereby the paper wiper bracket (1) is attached onto the ceiling of the passenger space of a car by the magnet (14) hidden in the container (12), a bottom face of the boxy chamber (16) is further provided a straight central hole for continuous subtraction of the wipers.

2. The paper wiper bracket as claimed in claim 1, wherein the boxy chamber (16) is made of a transparent material, and pictures of personal preference are disposed between the inner walls of the boxy chamber.

* * * * *